No. 761,610. PATENTED MAY 31, 1904.
B. C. RIBLET.
TRAMWAY TERMINAL.
APPLICATION FILED JAN. 23, 1904.
NO MODEL. 3 SHEETS—SHEET 1.
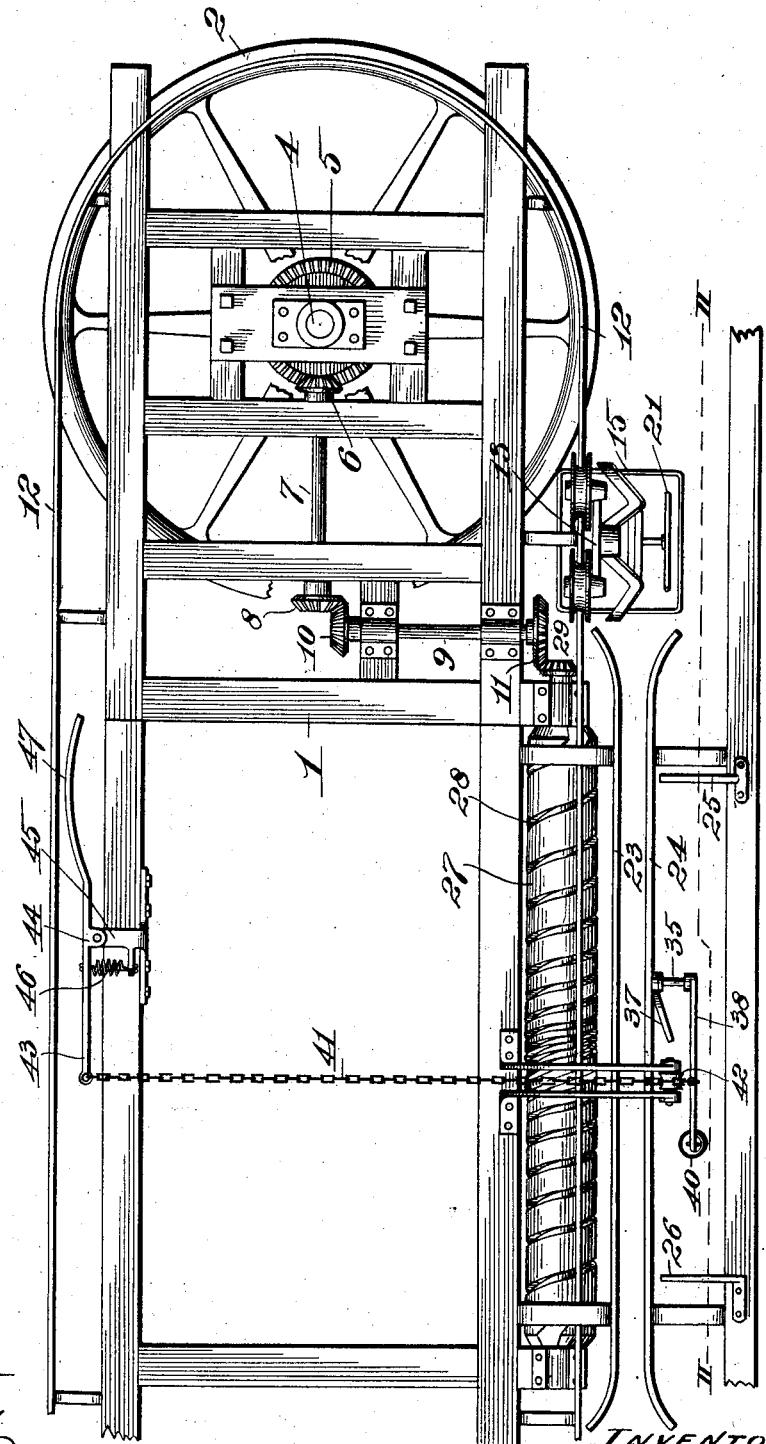
Fig. I.
attest:—
M. P. Smith
Blanche Hogan.
INVENTOR:—
B. C. Riblet
By Wright Bros Atty's No. 761,610. PATENTED MAY 31, 1904.
B. C. RIBLET.
TRAMWAY TERMINAL.
APPLICATION FILED JAN. 23, 1904.
NO MODEL. 3 SHEETS—SHEET 2.
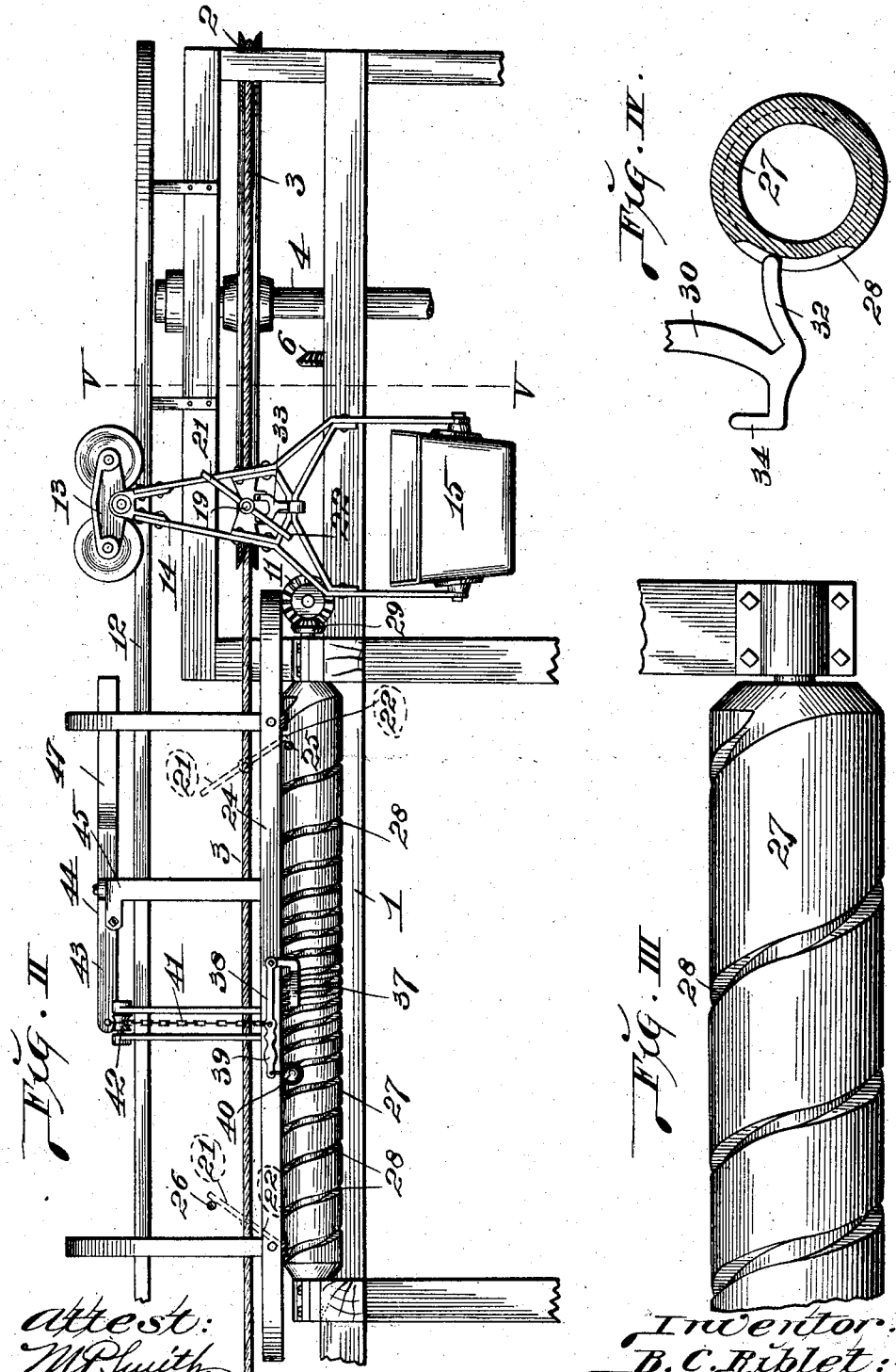

No. 761,610. PATENTED MAY 31, 1904.
B. C. RIBLET.
TRAMWAY TERMINAL.
APPLICATION FILED JAN. 23, 1904.
NO MODEL. 3 SHEETS—SHEET 3.
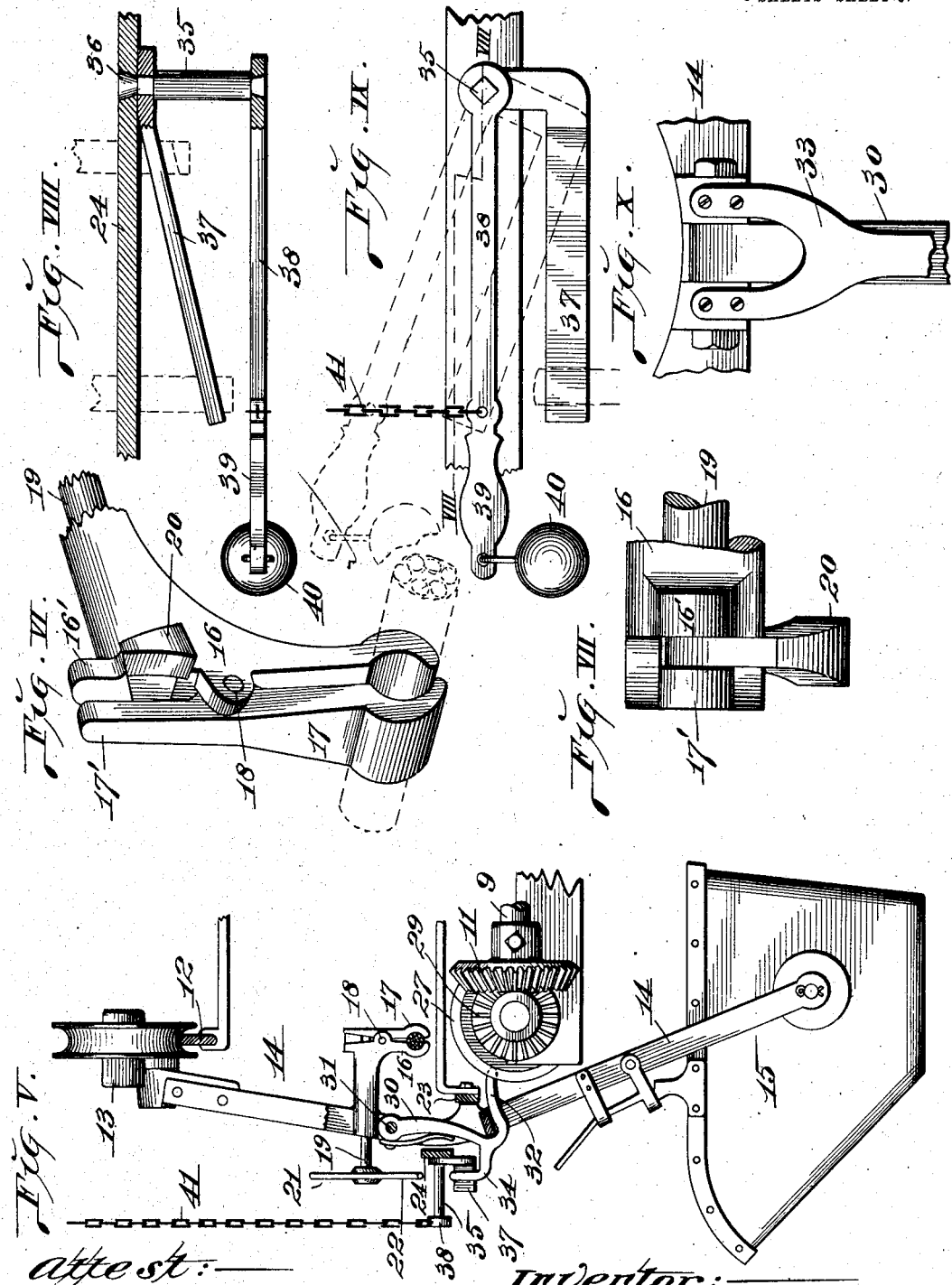

No. 761,610. Patented May 31, 1904.

UNITED STATES PATENT OFFICE.

BYRON C. RIBLET, OF SPOKANE, WASHINGTON.

TRAMWAY-TERMINAL.

SPECIFICATION forming part of Letters Patent No. 761,610, dated May 31, 1904.

Application filed January 23, 1904. Serial No. 190,367. (No model.)

*To all whom it may concern:*

Be it known that I, BYRON C. RIBLET, a citizen of the United States, residing in Spokane, in the county of Spokane and State of Washington, have invented certain new and useful Improvements in Tramway-Terminals, of which the following is a full, clear, and exact description, reference being had to the accompanying drawings, forming part of this specification.

My invention relates to an improvement in endless-wire-rope tramways.

The object of the invention is to provide a tramway-terminal with means whereby the conveyer-buckets are automatically brought to rest during the circuit of the tramway and their progress resumed after stoppage, said means embodying a construction whereby the speed at which the buckets travel is gradually diminished as they are brought to the resting-point and gradually increased when they are again started on their course.

My invention consists in features of novelty hereinafter fully described, and pointed out in the claims.

Figure I is a top or plan view of my tramway-terminal. Fig. II is a side elevation of the terminal. Fig. III is a view of a portion of the spirally-grooved drum through the medium of which the tramway-buckets are conveyed at the stoppage-station. Fig. IV is a cross-section of the drum shown in Fig. III and illustrating the lower end of the dog that engages said drum. Fig. V is an enlarged elevation of one of the conveyer-buckets, its supporting and carrying members, and part of the gearing of the tramway-terminal, with other parts of the terminal shown in vertical section, taken on line V V, Fig. II. Fig. VI is an enlarged perspective view of one of the rope-grippers supported by the bucket-carriers. Fig. VII is a top view of the gripper shown in Fig. VI. Fig. VIII is a section taken on line VIII VIII, Fig. IX. Fig. IX is a side view of the controlling members that govern the movement of the dog which engages the spiral drum of the tramway-terminal. Fig. X is a view of the upper portion of the drum spiral groove engaging dog and the governing-spring bearing thereagainst.

1 designates the framework of my tramway-terminal, in which is rotatably mounted the rope-receiving wheel 2, which may be driven directly or by the conveyer-rope 3, which travels thereon. 4 is the shaft of said wheel, to which is fixed a gear-wheel 5, that receives the mesh of the pinion 6, carried by a shaft 7. Upon the opposite end of said shaft is a pinion 8.

9 designates a shaft positioned at right angles to the shaft 7 and bearing a pinion 10, that meshes with the pinion 8 and having mounted upon its opposite end a pinion 11. These gearing members just described are utilized to transmit power from the rope-wheel 2 for a purpose to be hereinafter explained.

12 designates a track that extends in two parallel lines at opposite sides of the tramway and is curved concentrically with the rope-wheel 2 at the end of the terminal, as seen in Fig. I. The track 12 receives the carriages 13 of the bucket-carriers 14, from which the buckets 15, that are conducted on the tramway, are suspended. Each bucket-carrier 14 is equipped with a rope-gripper, that comprises a fixed jaw 16, which projects from the carrier, and a movable jaw 17, that is pivoted to the fixed jaw at 18. (See Figs. V and VI.) The gripping ends of these jaws are designed to grasp the conveyer-rope 3, and each jaw extends upwardly beyond the pivot-point 18 in the form of arms 16' and 17'.

19 is a rock-shaft extending through the shank of the fixed gripper-jaw 16 and bearing a spreader-wedge 20, that is adapted for movement between the arm 16' and 17' of the gripper-jaw. When this spreader-wedge is moved between said arms, the gripping end of the movable jaw 17 is carried to the gripping end of the fixed jaw 16 to grip the conveyer-rope between said members. Fixed to the outer end of the rock-shaft 19 is a pair of lever-arms 21 and 22, the former extending upwardly and the latter extending downwardly, as seen in Figs. II and V. These lever-arms engage members, to be hereinafter referred to, to automatically rock said shaft 19 and open and close the rope-gripper just described.

23 designates an inner guide-rail, and 24 an outer guide-rail, between which is a passage for the travel of the bucket-carrier 14 and intermediate of which said carrier passes just previous to its being brought to rest to continue a circuit in a course between said rails during the period that the carrier is free of propulsion by the conveyer-rope, due to the rope-gripper being disengaged therefrom in the manner to be set forth.

25 is a finger supported in the path of travel of the lower rock-shaft lever-arm 22, by which the rope-gripper is actuated and which is adapted to be struck by said lever-arm to rock the shaft 19 and move the spreader-wedge 20 out of a position between the gripper-jaw arms 16' and 17' to permit spread of said jaws, thereby releasing the rope previouly confined between them.

26 is a second finger (see Fig. I) located at a greater elevation than the finger 25, as illustrated in Fig. II, where it is in the path of travel of the upper lever-arm 21. This second finger is located near the exit end of the passage-way between the guide-rails 23 and 24, and when the lever-arm 21 comes in contact therewith the shaft 19 is rocked to again move the spreader-wedge 20 into a position between the gripper-jaw arms to again set them to the conveyer-rope. These actuations of the rope-gripper take place immediately preceding and immediately following the procedure of bringing the bucket-carriers gradually to rest and resuming their movement through the automatically-operated mechanism that will next be described.

27 designates a drum rotatively mounted in suitable bearings upon the framework 1 in a line parallel with the track 12 and the course of the conveyer-rope 3. This drum is provided with a spiral groove 28, formed therein from end to end. The spirals of the groove 28 are more widely separated near the ends of the drum 27 than those throughout the remainder of the drum, and the spaces between said spirals are gradually diminished from each end to the longitudinal center thereof, as clearly illustrated in Fig. II. As a result of the drum being so grooved it will be seen that the speed of travel of a member riding in the spiral groove 28 is much more rapid while the member is operating in the spirals of the groove near the ends of the drum, and the speed gradually diminishes toward the drum's center and again gradually increases as the member riding in the groove leaves said center. Rotation is imparted to the drum 27 through the medium of the gearing mechanism that leads from the rope-wheel 22 to the shaft 9 and by which power is transmitted from the pinion 11, fixed to said shaft, to a pinion 29, fixed to the drum 27.

30 designates a dog the upper end of which is pivoted at 31 to the bucket-carrier 14 and which carries a finger 32, that is adapted to engage in the spiral groove 28 of the drum 27. This dog is normally pressed inwardly by a spring 33 (see Figs. II, V, and X) in order that said finger will be carried into the spiral groove of the drum 27 when in proximity thereto. The dog 30 bears a heel 34, that extends outwardly therefrom.

35 is a rocker-rod having one end rotatively mounted at 36 (see Fig. VIII) in the guide-rail 24. This rocker-rod has fixed thereto a cam-arm 37, that extends outwardly at an angle to said guide-rail and is normally positioned in the path of travel of the heel 34 of the dog 30, as seen in Figs. V, VIII, and IX.

38 is a lever fixed to the rocker-rod 35 and having at its free end a handle 39, from which is suspended a weight 40.

41 is a chain connected to the lever 38 and extending upwardly therefrom to a pulley 42, supported at an elevation above the track 12 at the adjacent side of the tramway. From said pulley the chain 41 extends transversely of the tramway-framework to the opposite side thereof and is united to the pull-arm 43 of a trip-lever 44, pivotally connected to a bracket 45, mounted on the framework. The pull-arm 43 is controlled by a contraction-spring 46. The end of the trip-lever 44 is in the form of a trip-arm 47, that occupies a position in the path of travel of each conveyer-bucket carriage as it traverses the track 12 at the side of the tramway-terminal opposite that occupied by the stopping and starting mechanism hereinbefore described.

The practical operation of the parts in my tramway-terminal is as follows: As each bucket-carrier 14 reaches the guide-rails 23 and 24 its carriage 13 continues to travel on the track 12, while the carriage rides between said guide-rails. As before stated, these guide-rails are located in proximity to the rotatable spirally-grooved drum 27, which point is the stopping and starting station of the terminal for the buckets. The first action that takes place after the bucket-carriage enters between said guide-rails is that of the lever-arm 22, carried by the rock-shaft 19, striking the trip-pin 25 and rocking said shaft to release the gripper-jaws 16 and 17 from the rope 3 in the manner that has been explained. Propulsion of the bucket-carrier by said rope is therefore discontinued, and immediately thereafter the finger 32 of the dog 30 enters into the spiral groove 28 at the forward end of the drum 27 to travel therein. The said drum is in continuous rotation, and therefore the dog-finger as it rides in the spiral groove constantly advances therein longitudinally of the drum, thereby effecting travel of the bucket-carrier. As a result of the spirals of the groove 28 being spaced apart in diminishing degree from the forward end of the drum to the longitudinal center thereof the speed at which the bucket-carrier is conveyed is gradually lessened until the dog has reached the longitudinal center of the drum. As the dog approaches the drum's center its heel 34 rides into engagement with the cam-arm 37, as seen in Figs. V, VIII, and IX, and by reason of such engagement the finger of the dog is drawn outwardly, thereby removing it from the spiral groove in the drum, so that driving engagement between the drum and the bucket-carrier is discontinued, and the bucket is at rest at the stopping and starting station of the terminal. The starting of the bucket-carrier on its course is again occasioned in the following manner: As the next succeeding bucket-carrier reaches the terminal of the tramway its carriage engages the trip-lever arm 47 of the lever 44 and forces said arm inwardly against the action of the spring 46. (See Fig. I.) The result is that a pull is exerted upon the chain 41 leading to the lever 38, which, by overcoming the depressing tendency of the weight 40, suspended from said lever, lifts the lever into the position seen in dotted lines, Fig. IX, and therefore raises the cam-arm 37 out of engagement with the heel of the dog 30 and permits renewed entrance of the dog-finger 32 into the spiral groove of the drum 27 at a point approximately the same as that from which it was previously withdrawn. It is therefore apparent that the rotating drum will again act to impart movement to the bucket-carrier as a result of the dog-finger riding in its groove, and as the carrier moves forwardly its speed will be gradually increased, due to the increasing spacing between the spirals of the drum leading from its center to the far end, and this increase of speed is rendered such that a speed corresponding to that of the conveyer-rope 3 is attained by the bucket-carrier by the time that or before the time that the drum-engaging dog reaches the far end of the drum. When the bucket-carrier reaches the location of the tripping-pin 26, said pin is engaged by the lever-arm 21 to rock the shaft 19 in the opposite direction from its previous movement. This engagement causes the spreader-wedge 20 to be rocked into position between the gripper-jaw arms 16' and 17', and the gripping ends of the jaws 16 and 17 are therefore clamped to the conveyer-rope to continue in engagement therewith until the other terminal of the tramway is reached. It will be observed that the lever 38, by which the cam-arm 37 is controlled, is provided with a handle 39. The purpose of this is to permit manual actuation of said lever instead of automatic or mechanical actuation thereof in the manner set forth.

I claim as my invention—

1. In a tramway-terminal having a stopping and starting station, the combination of a conveyer-rope, a carrier, a rope-gripper mounted on said carrier for engagement with said rope, means for releasing said gripper from said rope at said station, and a rotatable drum at said station to receive engagement of said carrier to impart movement thereto after said gripper is released, substantially as set forth.

2. In a tramway-terminal having a stopping and starting station, the combination of a conveyer-rope, a carrier provided with means for engaging said rope, means for releasing said rope-engaging means, a spirally-grooved revoluble drum located at said station, and means carried by said carrier for engagement with said drum to impart movement to the carrier after said rope-engaging means is released, substantially as set forth.

3. In a tramway-terminal having a stopping and starting station, the combination of a conveyer-rope, a carrier provided with means for engaging said rope, means for releasing said rope-engaging means, a spirally-grooved revoluble drum located at said station, and having the spirals therein more widely separated at its ends than at its longitudinal center, and means carried by said carrier for engagement with said drum to impart movement to the carrier after said rope-engaging means is released, substantially as set forth.

4. In a tramway-terminal having a stopping and starting station, the combination of a conveyer-rope, a carrier provided with means for engaging said rope, means for releasing said rope-engaging means, a spirally-grooved revoluble drum located at said station, and a dog carried by said carrier for engagement with said drum to impart movement to the carrier, substantially as set forth.

5. In a tramway-terminal having a stopping and starting station, the combination of a conveyer-rope, a carrier provided with means for engaging said rope, means for releasing said rope-engaging means, a spirally-grooved revoluble drum located at said station, and a swingingly-supported dog carried by said carrier for engagement with said drum to impart movement to the carrier, substantially as set forth.

6. In a tramway-terminal having a stopping and starting station, the combination of a conveyer-rope, a carrier provided with means for engaging said rope, means for releasing said rope-engaging means, a spirally-grooved revoluble drum located at said station, and a spring-pressed dog carried by said carrier for engagement with said drum to impart movement to the carrier, substantially as set forth.

7. In a tramway-terminal having a stopping and starting station, the combination of a conveyer-rope, a carrier provided with means for engaging said rope, means for releasing said rope-engaging means, a rotatable drum at said station, means carried by said carrier for engagement with said drum to impart movement to the carrier and means for withdrawing said drum-engaging means from the drum during the period of its traversing the same, substantially as set forth.

8. In a tramway-terminal having a stopping and starting station, the combination of a conveyer-rope, a carrier provided with means for engaging said rope, means for releasing said rope-engaging means, a rotatable drum at said station, means carried by said carrier for engagement with said drum to impart movement to the carrier, means for withdrawing said drum-engaging means from the drum during the period of its traversing the same, and means for freeing said drum-engaging means and permitting its return to said drum, substantially as and for the purpose set forth.

9. In a tramway-terminal having a stopping and starting station, the combination of a conveyer-rope, a carrier provided with means for engaging said rope, means for releasing said rope-engaging means, a revoluble drum located at said station, a dog carried by said carrier, and a cam-arm to be engaged by said dog to withdraw it from engagement with said drum, substantially as set forth.

10. In a tramway-terminal having a stopping and starting station, the combination of a conveyer-rope, a carrier provided with means for engaging said rope, means for releasing said rope-engaging means, a revoluble drum located at said station, a dog carried by said carrier, a cam-arm to be engaged by said dog to withdraw it from engagement with said drum, and a lever connected to said cam-arm to move it out of engagement with said dog, substantially as set forth.

11. In a tramway-terminal having a stopping and starting station, the combination of a conveyer-rope, a carrier provided with means for engaging said rope, means for releasing said rope-engaging means, a revoluble drum located at said station, a dog carried by said carrier, a cam-arm to be engaged by said dog to withdraw it from engagement with said drum, and a weighted lever connected to said cam-arm to move it out of engagement with said dog, substantially as set forth.

12. In a tramway-terminal having a stopping and starting station, the combination of a conveyer-rope, a carrier provided with means for engaging said rope, means for releasing said rope-engaging means, a revoluble drum located at said station, a dog carried by said carrier, a cam-arm to be engaged by said dog to withdraw it from engagement with said drum, a lever connected to said cam-arm to move it out of engagement with said dog, and a tripping-lever to be engaged by the carrier and connected to the cam-arm lever, substantially as set forth.

13. In a tramway-terminal having a stopping and starting station, the combination of a conveyer-rope, a carrier provided with means for engaging said rope, means for releasing said rope-engaging means, a revoluble drum located at said station, a dog carried by said carrier, a cam-arm to be engaged by said dog to withdraw it from engagement with said drum, a lever connected to said cam-arm to move it out of engagement with said dog, and a spring-controlled tripping-lever to be engaged by the carrier and connected to the cam-arm lever, substantially as set forth.

14. In a tramway-terminal having a stopping and starting station, the combination of a conveyer-rope, a carrier, a gripper carried by said carrier for engaging said rope and provided with a rock-shaft, lever-arms carried by said rock-shaft, means engaged by said lever-arms to rock said shaft and open the gripper-jaws, and means independent of the conveyer-rope for imparting movement to said carrier at said station, substantially as set forth.

15. In a tramway-terminal having a stopping and starting station, the combination of a conveyer-rope, a carrier, a gripper carried by said carrier for engaging said rope and provided with a rock-shaft, lever-arms carried by said rock-shaft, pins arranged in the path of travel of said lever-arms to be engaged thereby to rock said shaft and open the gripper-jaws, and means independent of the conveyer-rope for imparting movement to said carrier at said station, substantially as set forth.

16. In a tramway-terminal having a stopping and starting station, the combination of a conveyer-rope, a carrier, a gripper carried by said carrier for engaging said rope and provided with a rock-shaft, lever-arms carried by said rock-shaft, pins arranged in the path of travel of said lever-arms to be engaged thereby to rock said shaft and open the gripper-jaws, and means independent of the conveyer-rope for imparting movement to said carrier at said station; one of said pins being located beneath the axis of said rock-shaft and the other pin being located above the axis of said shaft, whereby said lever-arms are moved in one direction at one end of the stopping and starting station, and in the opposite direction at the other end of said station, substantially as set forth.

17. In a tramway-terminal having a stopping and starting station, the combination of a conveyer-rope, a carrier provided with means for engaging said rope, means for releasing said rope-engaging means, a spirally-grooved revoluble drum located at said station, a spring-pressed dog carried by said carrier, a finger carried by said dog for engaging in the groove of said drum, a heel projecting from the dog, and means located in proximity to said drum to be engaged by the heel of said dog to withdraw it from said groove, substantially as set forth.

BYRON C. RIBLET.

In presence of—
A. H. WHEATLEY,
GEO. BRINKERHOFF.